United States Patent
She (10) Patent No.: US 7,499,265 B2
(45) Date of Patent: Mar. 3, 2009

(54) DISPLAYING DEVICE AND SUPPORTING STRUCTURE OF THE SAME

(75) Inventor: Wei-Shin She, Taishan Township, Taipei County (TW)

(73) Assignee: Qisda Corporation, Taoyuan County (TW)

( * ) Notice: Subject to any disclaimer, the term of this patent is extended or adjusted under 35 U.S.C. 154(b) by 289 days.

(21) Appl. No.: 11/585,830

(22) Filed: Oct. 25, 2006

(65) Prior Publication Data

US 2007/0103856 A1 May 10, 2007

(30) Foreign Application Priority Data

Nov. 10, 2005 (TW) .............................. 94139502 A (51) Int. Cl.
*G06F 1/16* (2006.01)
(52) U.S. Cl. ..................... 361/681; 248/187.1; 248/917
(58) Field of Classification Search ................. 361/681; 248/187.1, 316.5, 917–924
See application file for complete search history.

(56) References Cited

U.S. PATENT DOCUMENTS 6,168,124 B1 * 1/2001 Matsuoka et al. ........ 248/176.1
6,816,364 B2 * 11/2004 Helot et al. .................. 361/681
6,987,666 B2 * 1/2006 Medica et al. ............... 361/681
7,088,577 B2 * 8/2006 Lauffer et al. ................ 361/683
7,143,478 B2 * 12/2006 Quijano ........................ 16/445
D541,278 S * 4/2007 Hsu et al. .................. D14/375
2006/0032998 A1 * 2/2006 Depay ...................... 248/291.1
2006/0124804 A1 * 6/2006 Lin ............................. 248/65
2007/0076358 A1 * 4/2007 Hsu ........................... 361/681

FOREIGN PATENT DOCUMENTS

EP        1758011 A2 *   2/2007

* cited by examiner

*Primary Examiner*—Lisa Lea-Edmonds (57) ABSTRACT

A display device includes a display panel and a supporting structure. The supporting structure is connected to the display panel. The supporting structure includes a first body and a second body. The first body has a releasing part and an anti-sliding part. The releasing part is movable between a first position and a second position. The second body is detachably connected to the first body. The second body includes a first fastening part and a second fastening part. The first fastening part is for fastening the releasing part. The second fastening part is for fastening the anti-sliding part. When the releasing part is positioned at the first position, the releasing part is engaged with the first fastening part. When the releasing part is positioned at the second position, the second body moves along the first direction for enabling the anti-sliding part to be fastened by the second fastening part.

15 Claims, 10 Drawing Sheets

DISPLAYING DEVICE AND SUPPORTING STRUCTURE OF THE SAME

This application claims the benefit of Taiwan application Serial No. 94139502, filed Nov. 10, 2005, the subject matter of which is incorporated herein by reference.

BACKGROUND OF THE INVENTION

1. Field of the Invention

The invention relates in general to a display device and a supporting structure of the same, and more particularly to a display device with multi-stage engagement and a supporting structure of the same.

2. Description of the Related Art

In order to save the space, the base is often designed to be detachable from the display device during the delivery and storage of the display device. Not until the display device has been delivered to the customer for being used will the base be assembled with the display device. When the user would like to move the display device, the base is detached from the display device to save the space and facilitate the removal.

Figure 1A:
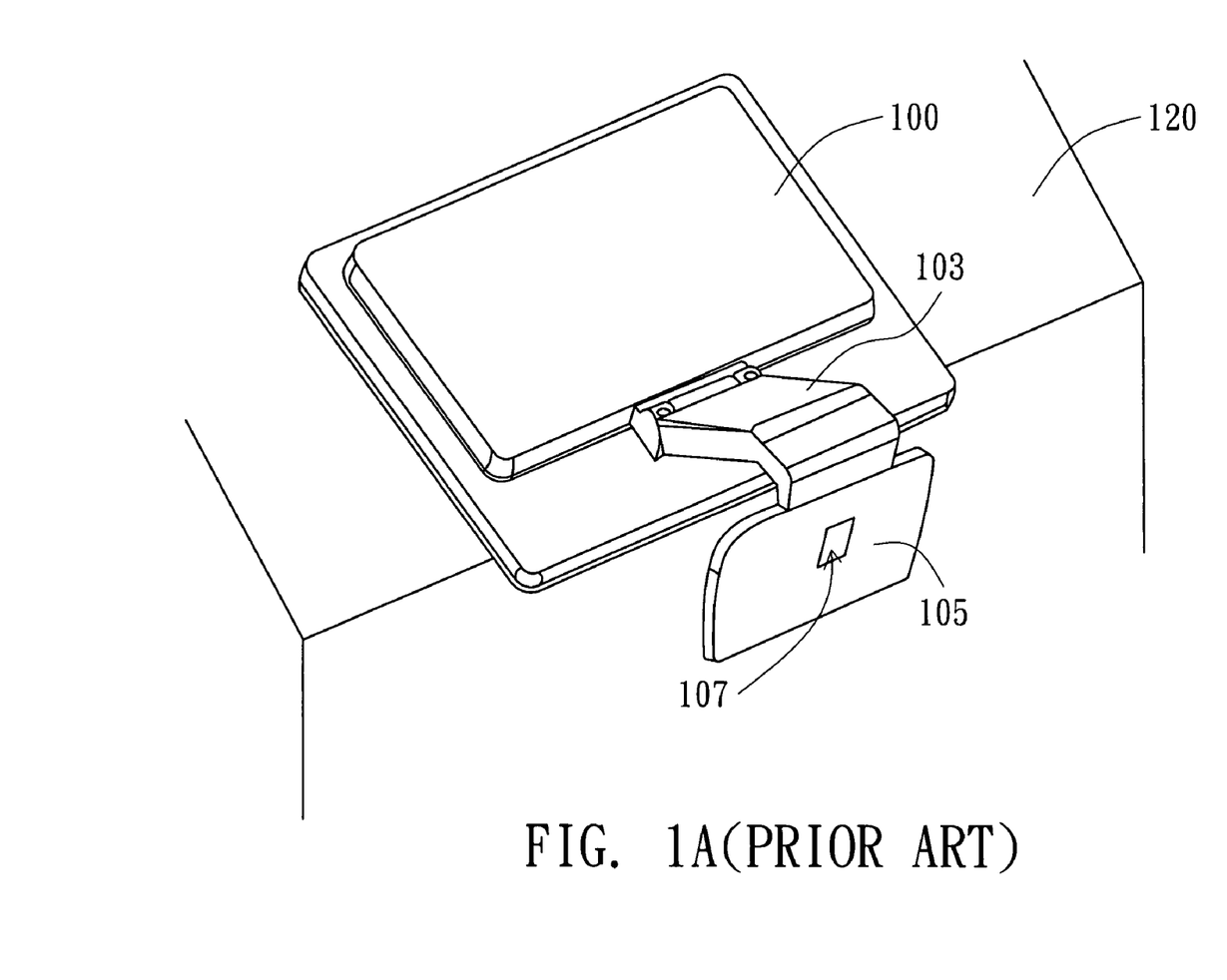
FIG. 1A and FIG. 1B (Prior Art) are diagrams illustrating the step of detaching the base of a liquid crystal display device.
Figure 1B:
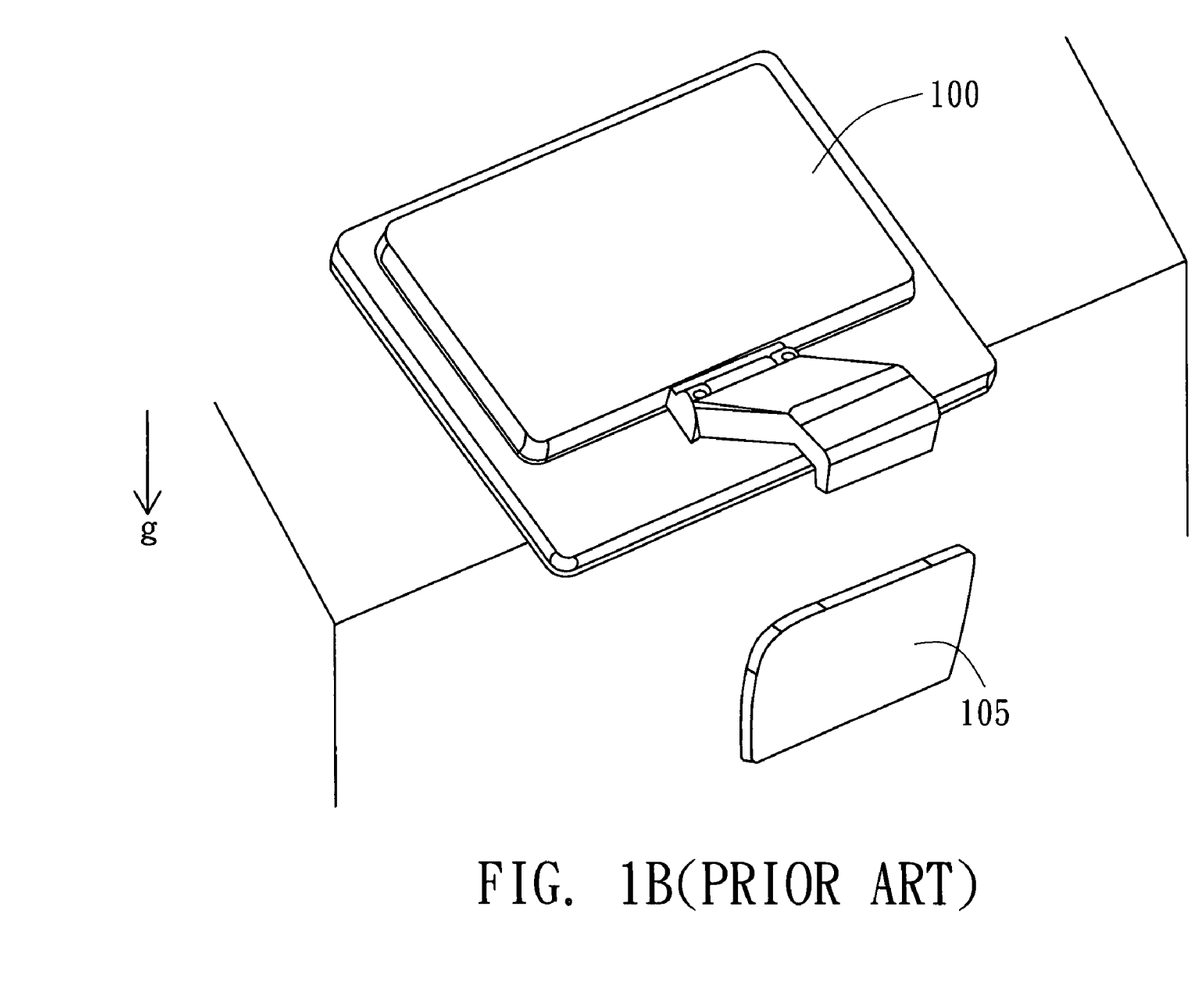

Referring to FIG. 1A and FIG. 1B, diagrams illustrating the steps of detaching the base of a liquid crystal display device are shown. In FIG. 1A, when a user would like to detach the base 105, the display device 100 is laid flat on the desktop 120, and the base 105 is released when the button 107 of the supporting frame 103 is pressed by the user. However, since the base 105 weighs, if the user presses the button 107 but does not hold the base 105, the base 105 will come off and drop on the user's feet or become damaged.

SUMMARY OF THE INVENTION

It is therefore an object of the invention to provide a display device and the base thereof capable of reminding and providing the user with safe assembly and disassembly for preventing the base from hurting the user or being damaged due to the user's negligence.

The invention achieves the above-identified object by providing a supporting structure. The supporting structure includes a first body and a second body. The first body has a releasing part and an anti-sliding part. The releasing part is movable between a first position and a second position. The second body is detachably connected to the first body. The second body includes a first fastening part and a second fastening part. The first fastening part is for fastening the releasing part. The second fastening part is for fastening the anti-sliding part. When the releasing part is positioned at the first position, the releasing part is engaged with the first fastening part. When the releasing part is positioned at the second position, the releasing part is detached from the first fastening part. The second body is able to move along a first direction for enabling the second fastening part to fasten the anti-sliding part.

The invention further achieves the above-identified object by providing a display device. The display device includes a display panel and a supporting structure. The supporting structure is connected to the display panel. The supporting structure includes a first body and a second body. The first body has a releasing part and an anti-sliding part. The releasing part is movable between a first position and a second position. The second body is detachably connected to the first body. The second body includes a first fastening part and a second fastening part. The first fastening part is for fastening the releasing part. The second fastening part is for fastening the anti-sliding part. When the releasing part is positioned at the first position, the releasing part is engaged with the first fastening part. When the releasing part is positioned at the second position, the second body is able to move along the first direction for enabling the anti-sliding part to be fastened by the second fastening part.

Other objects, features, and advantages of the invention will become apparent from the following detailed description of the preferred but non-limiting embodiments. The following description is made with reference to the accompanying drawings.

DETAILED DESCRIPTION OF THE INVENTION

First Embodiment

Figure 2A:
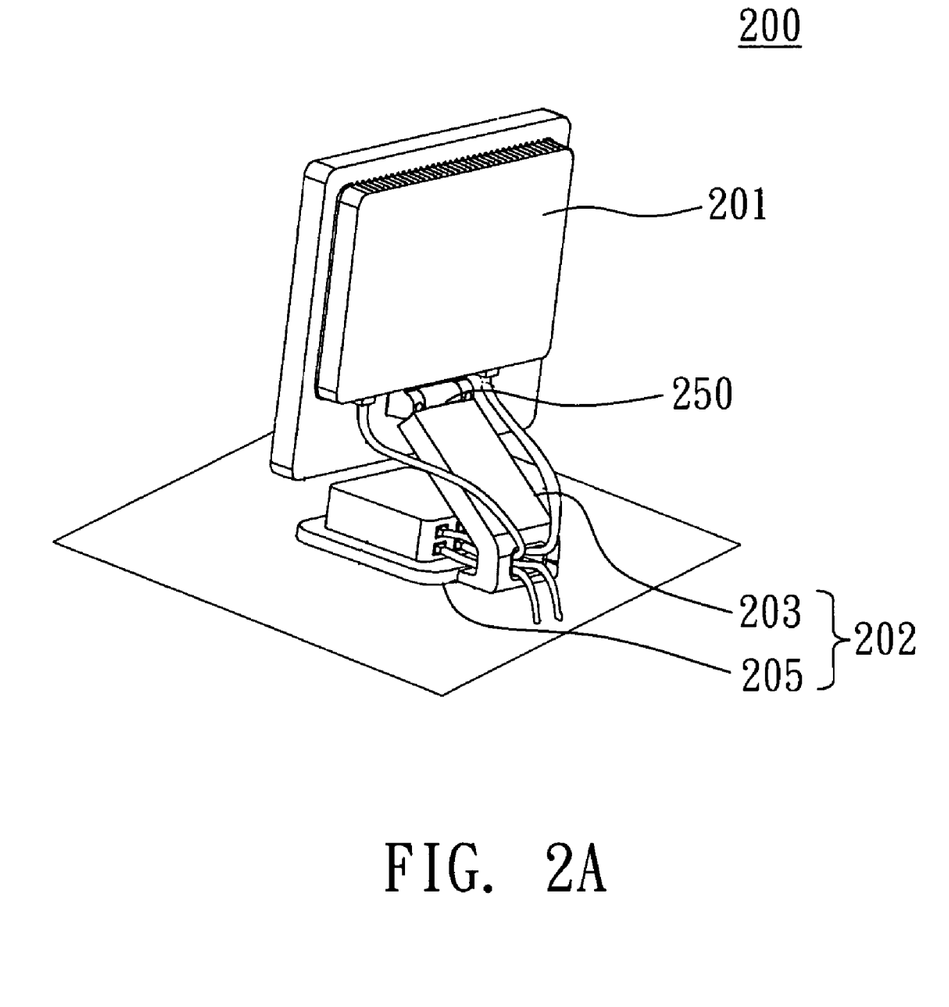
FIG. 2A is a perspective view of a standing display device.
Figure 2B:
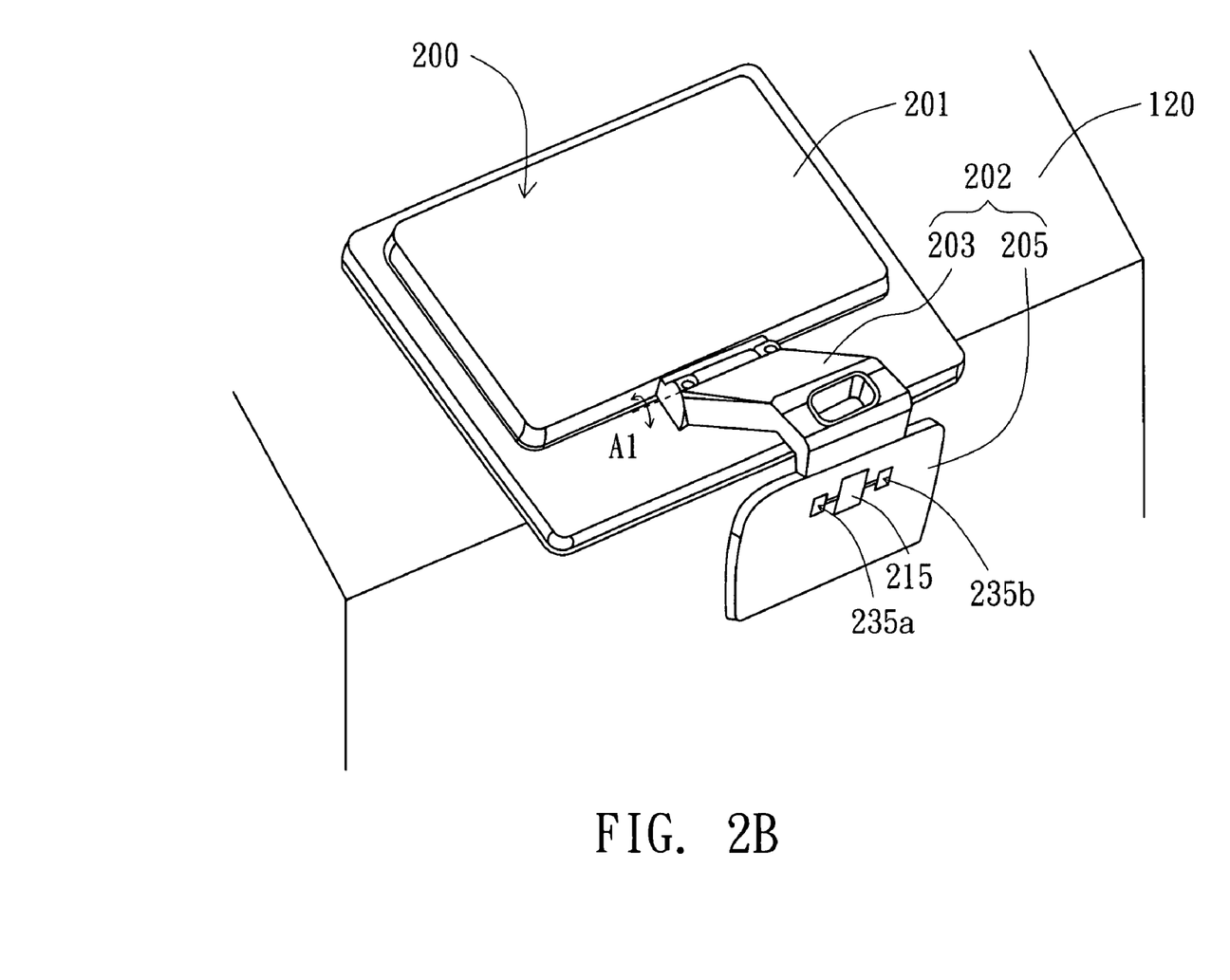
FIG. 2B is a perspective view of a laid-flat display device.

Referring to both FIG. 2A and FIG. 2B, FIG. 2A is a perspective view of a standing display device, while FIG. 2B is a perspective view of a laid-flat display device. The display device 200 includes a display panel 201 and a supporting structure 202. The display panel 201 and the supporting structure 202 are rotatably connected via a rotation device 250. Examples of the rotation device 250 include a spindle. As shown in FIG. 2B, the supporting frame 203 can rotate with respect to an axis A1. When a user would like to detach the base 205, the display panel 201 can be placed on a desktop and face downwards. By pressing the button 215 as well as the first protrusion 235a and the second protrusion 235b on the base 205, the user can detach the base 205 safely. The supporting structure 202 includes a first body and a second body. Examples of the first body include a supporting frame 203. Examples of the second body include a base 205. The first body has a releasing part and an anti-sliding part 218 (illustrated in FIG. 2C). Examples of the releasing part include a button 215.

Figure 2C:
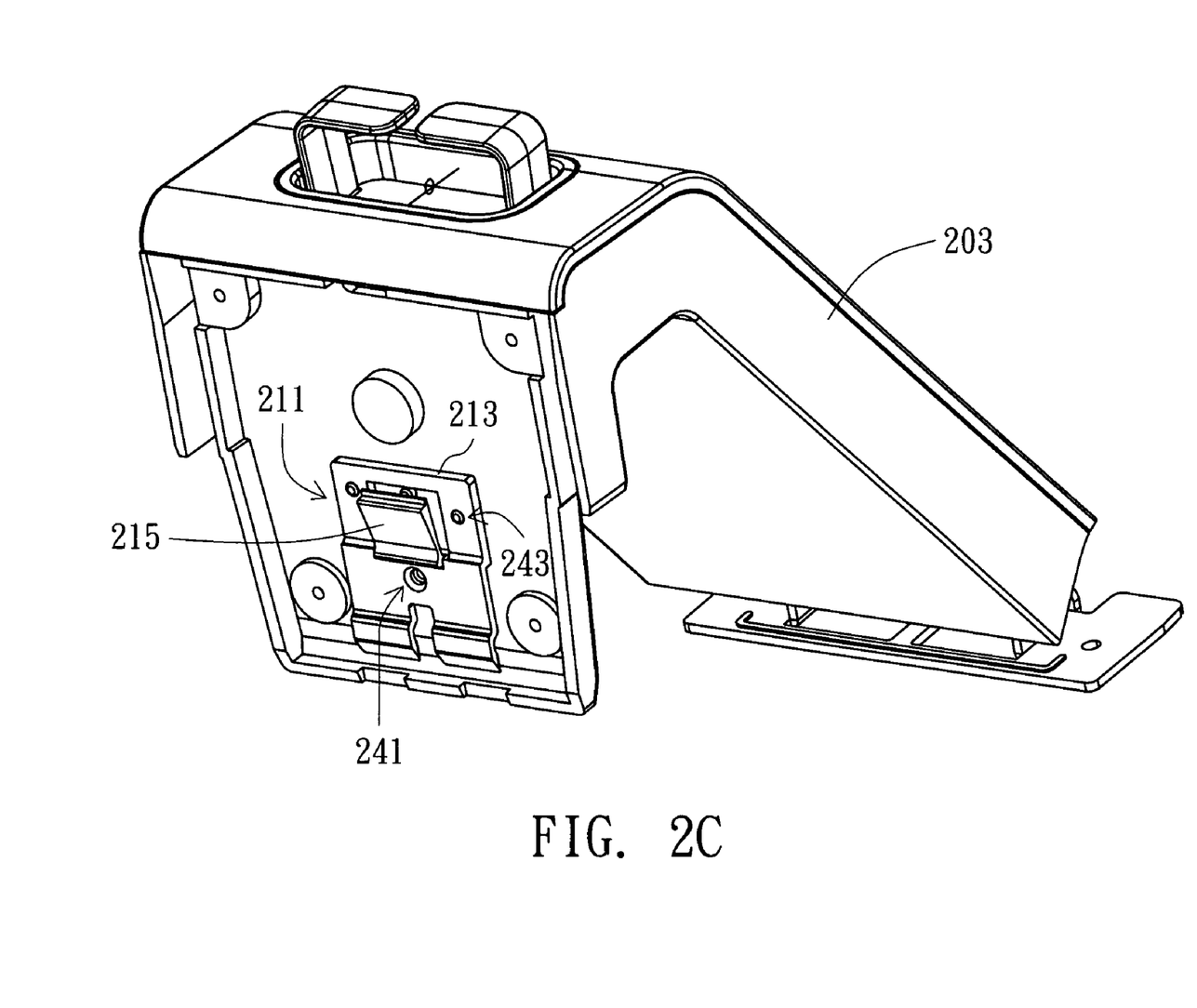
FIG. 2C is a perspective view of the bottom of a supporting frame.
Figure 2D:
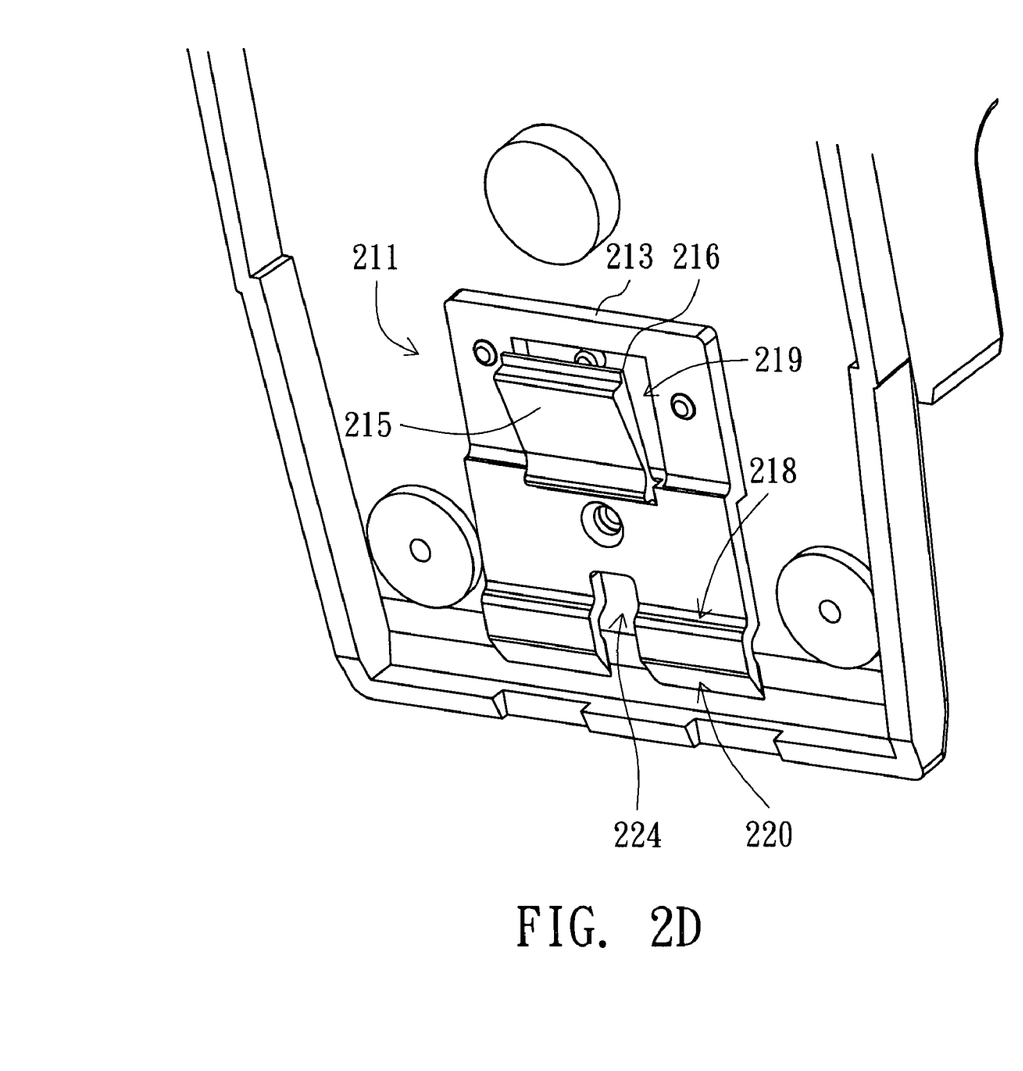
FIG. 2D is a partial enlarged view of the supporting frame in FIG. 2C.

Referring to both FIG. 2C and FIG. 2D, FIG. is a perspective view of the bottom of a supporting frame, and FIG. 2D is a partial enlarged view of the supporting frame in FIG. 2C. The first body (the supporting frame 203) has a releasing structure 211. The releasing structure 211 is fixed on the bottom of the supporting frame 203 via a fastening hole 241 and a positioning hole 243. The way of fixing the releasing structure is not limited. For example, the releasing structure 211 may be fixed by a screw. The releasing structure 211 has a body 213 and a button 215. The body 213 has an opening 219 for providing a pressing space to the button 215. The anti-sliding part 218 is a ramp, and an inserting part 220 is adjacent to the anti-sliding part 218.

Figure 2E:
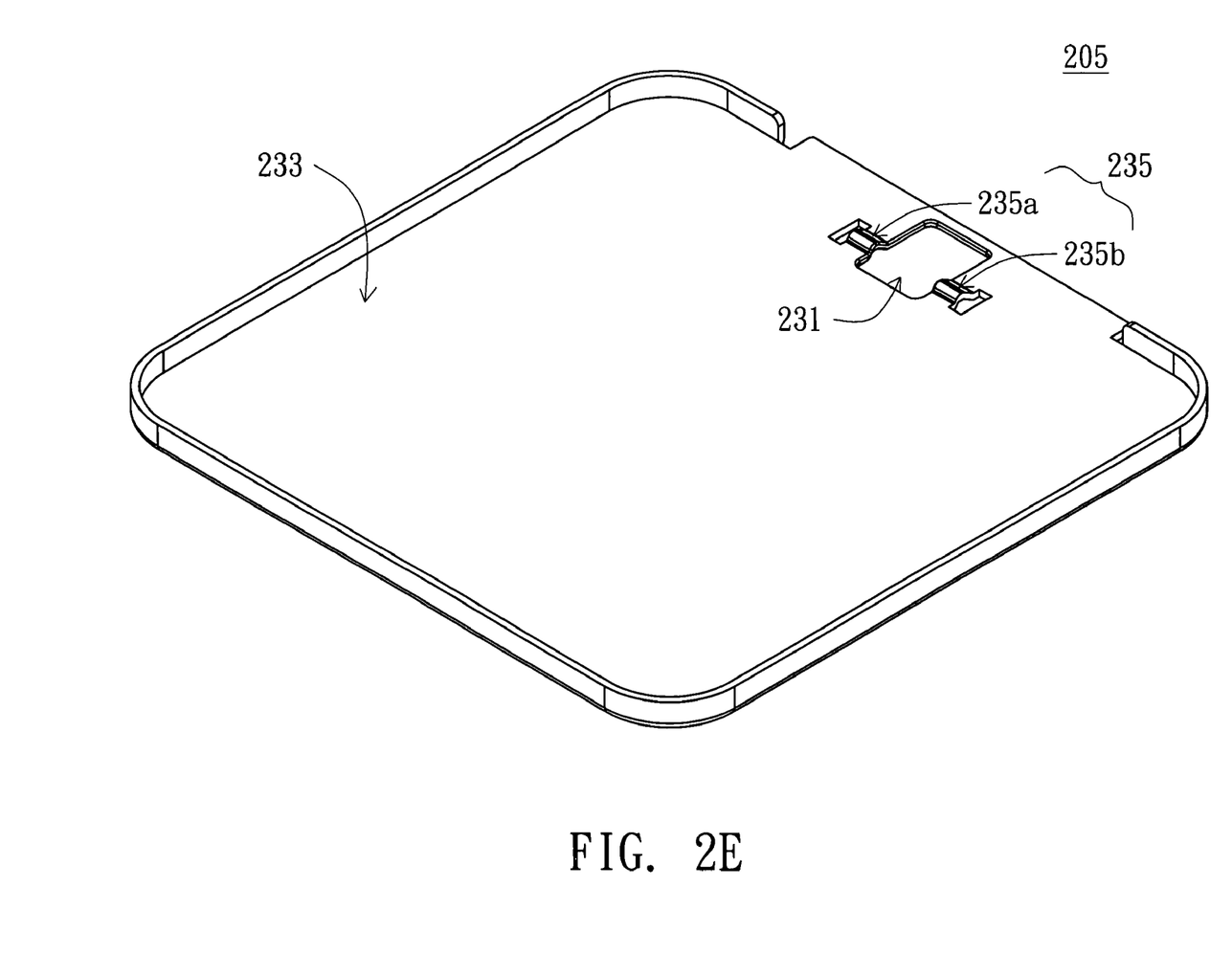
FIG. 2E is a perspective view of the inner side surface of the base.
Figure 2F:
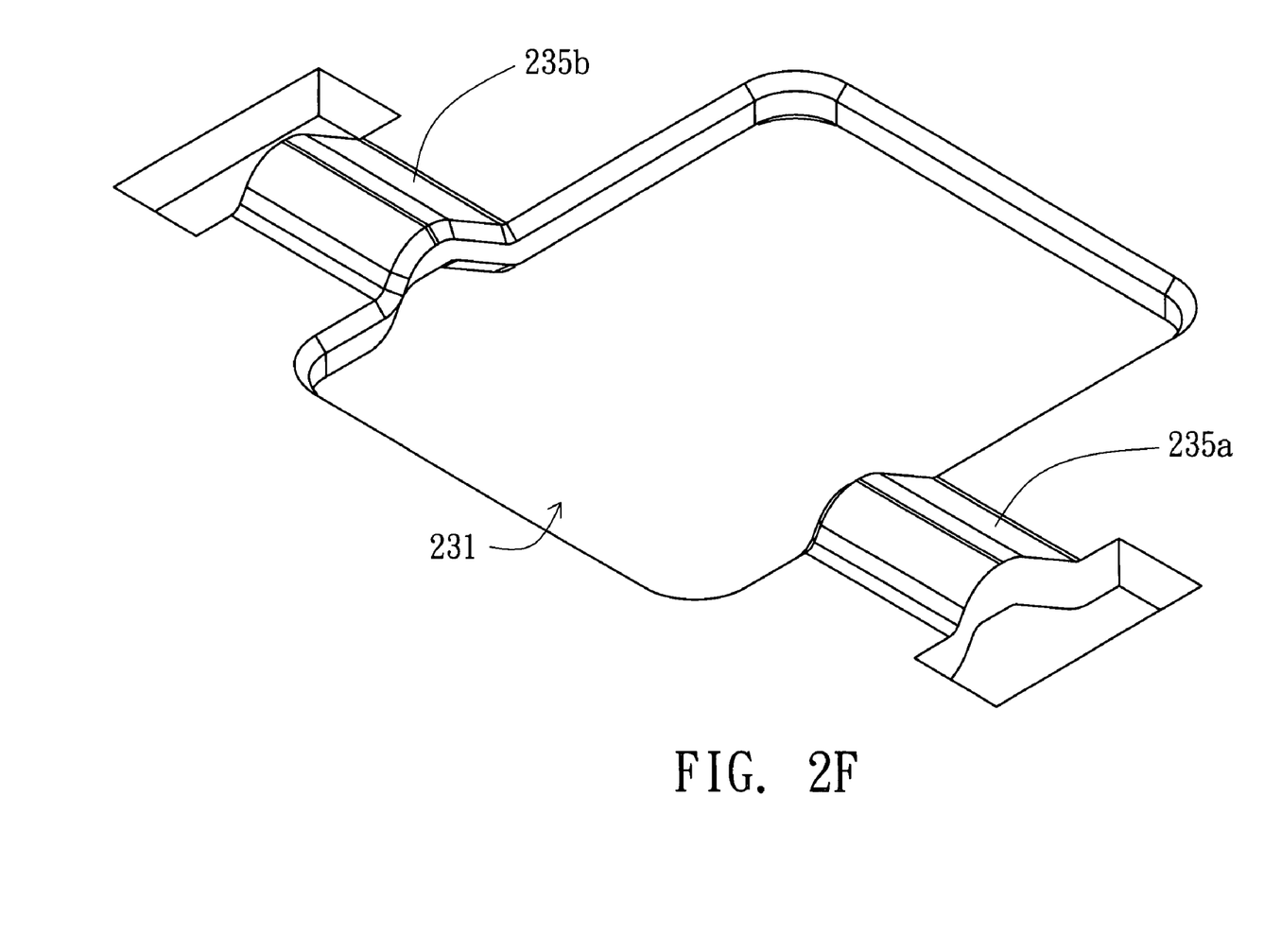
FIG. 2F is a partial enlarged view of the inner side surface of the base in FIG. 2E.

Referring to both FIG. 2E and FIG. 2F, FIG. 2E is a perspective view of the inner side surface of the base, while FIG. 2F is a partial enlarged view of the inner side surface of the base in FIG. 2E. The second body (the base 205) includes a first fastening part 216 and a second fastening part 235. The second fastening part 235 includes a first protrusion 235a and a second protrusion 235b. In FIG. 2E, there is an inner side surface 233 of the base 205 via which the base 205 is engaged with the releasing structure 211. The base 205 has a base opening 231 for receiving the button 215, such that the user can press the button 215. A first protrusion 235a and a second protrusion 235b are adjacent to the two sides of the base opening 231. The relative relationship between the releasing structure and the base and how the releasing structure and the base are engaged are disclosed below.

Figure 3A:
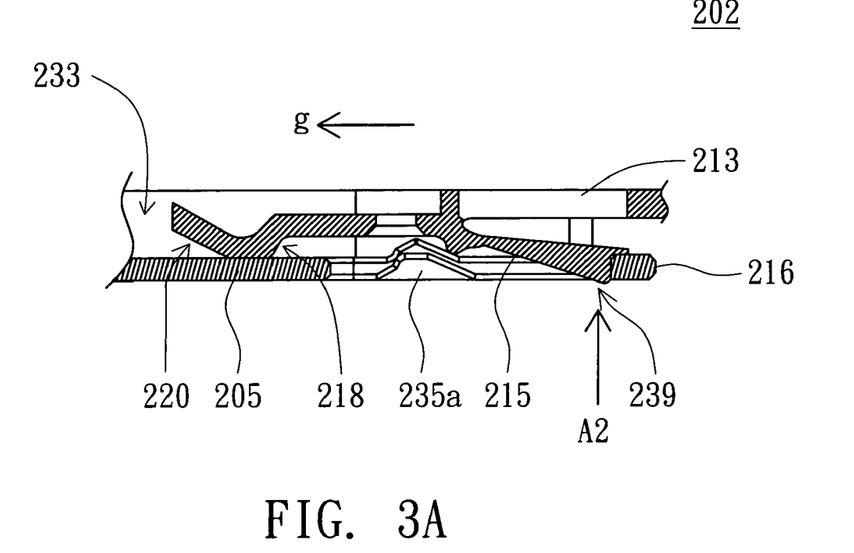
FIG. 3A is a cross-sectional view of a supporting structure when the releasing part is positioned at a first position.
Figure 3B:
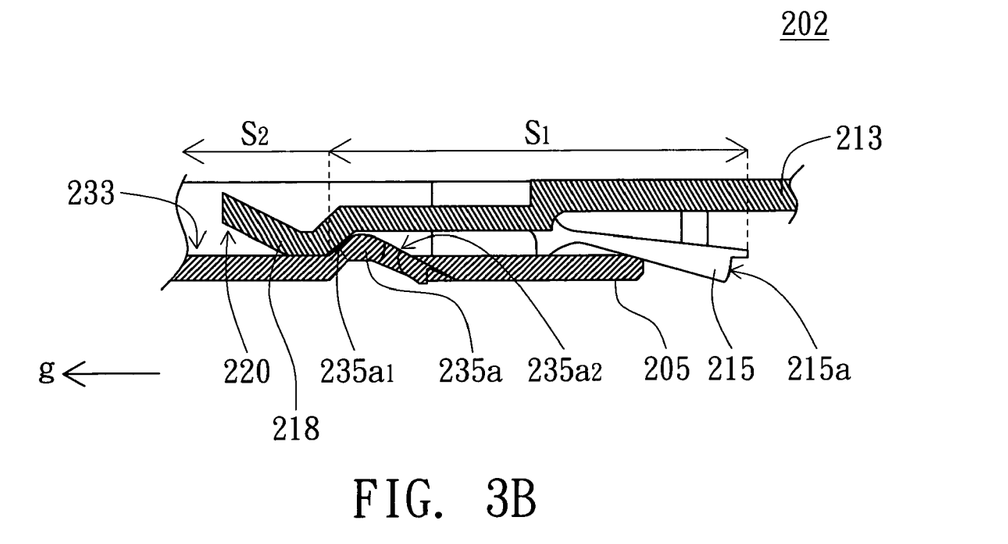
FIG. 3B is a cross-sectional view of a supporting structure when the releasing part is positioned at a second position.

Referring to both FIG. 3A and FIG. 3B, FIG. 3A is a cross-sectional view of a supporting structure when the releasing part is positioned at a first position. FIG. 3B is a cross-sectional view of a supporting structure when the releasing part is positioned at a second position. Under the normal state as shown in FIG. 2B, when the base 205 is assembled with the supporting frame 203, the protruding part 239 of the button 215 is engaged with the first fastening part 216 of the base 205. The button 215 has a recess 215a whose width is substantially equal to the thickness of the base 205. The button 215 resists the first fastening part 216 of the base 205 by the recess 215a for preventing the base 205 from sliding towards the first direction (the gravitational direction g). When the user would like to detach the base 205, the user, first of all, presses the button 215 to move towards a second direction A2. The button 215 is shifted along the direction A2, such that the recess 215a is detached from the base 205. The base 205 slides along a gravitational direction g (the first direction) by gravity until the first protrusion 235a and the second protrusion 235b (illustrated in FIG. 2E) fasten the anti-sliding part 218. The first direction is substantially perpendicular to the second direction. When the base 205 moves along the course S1 by its gravity, the base 205 does not come off directly, hence assuring the security of the user. The anti-sliding part 218 is a ramp. The first protrusion 235a and the second protrusion 235b also have a ramp, such as a ramp 235a1 for instance. The slope of the ramp of the anti-sliding part 218 is substantially equal to the slope of the ramp 235a1 of the first protrusion 235a and the second protrusion 235b, such that the anti-sliding part 218 is more tightly engaged with the first protrusion 235a and the second protrusion 235b.

When the user would like to detach the base 205 from the releasing structure 211, the user has to overcome the friction between the anti-sliding part 218 and the first protrusion 235a and the second protrusion 235b. Thus the user has to pull the base 205 heavily. The releasing structure 211 is a plastic piece and has elasticity, such that the anti-sliding part 218 can be deformed for enabling the first protrusion 235a and the second protrusion 235b to be released from the anti-sliding part 218. The user can grip and detach the base 205. The function of the anti-sliding part 218 is to force the user to grip and detach the base 205 during the last course of movement, that is, the course S2. Consequently, the base 205 will not come off by its gravity which may cause accident to the user or cause damage to the base.

In the present embodiment of the invention, the base 205 is an iron piece and the releasing structure 211 is a plastic piece. The releasing structure 211 can be made from any suitable materials. The button 215 and the body 213 can be made by different materials as long as the button 215 and the anti-sliding part 218 of the body 213 have elasticity. Meanwhile, referring to FIG. 2D, a deformed opening 224 is adjacent to the anti-sliding part 218 for providing the anti-sliding part 218 with a deformation space when the user overcomes the resistance of the first protrusion 235a and the second protrusion 235b.

Referring to FIG. 3A and FIG. 3B, on the body 213, an inserting part 220 adjacent to the anti-sliding part 218 is a ramp. The slope of the ramp of the inserting part 220 is smaller than the slop of the ramp of the anti-sliding part 218. The slope of the ramp 235a2 of the first protrusion 235a is also smaller than the slope of the ramp 235a1. Thus, when inserting the base 205 to be fixed on the releasing structure 211, the user will be able to overcome the friction between the first protrusion 235a and the releasing structure 211 by pushing the base 205 lightly, and the base 205 will be pushed to the position at which the protruding part 239 of the button 215 is engaged with the base 205.

Second Embodiment

Figure 4:
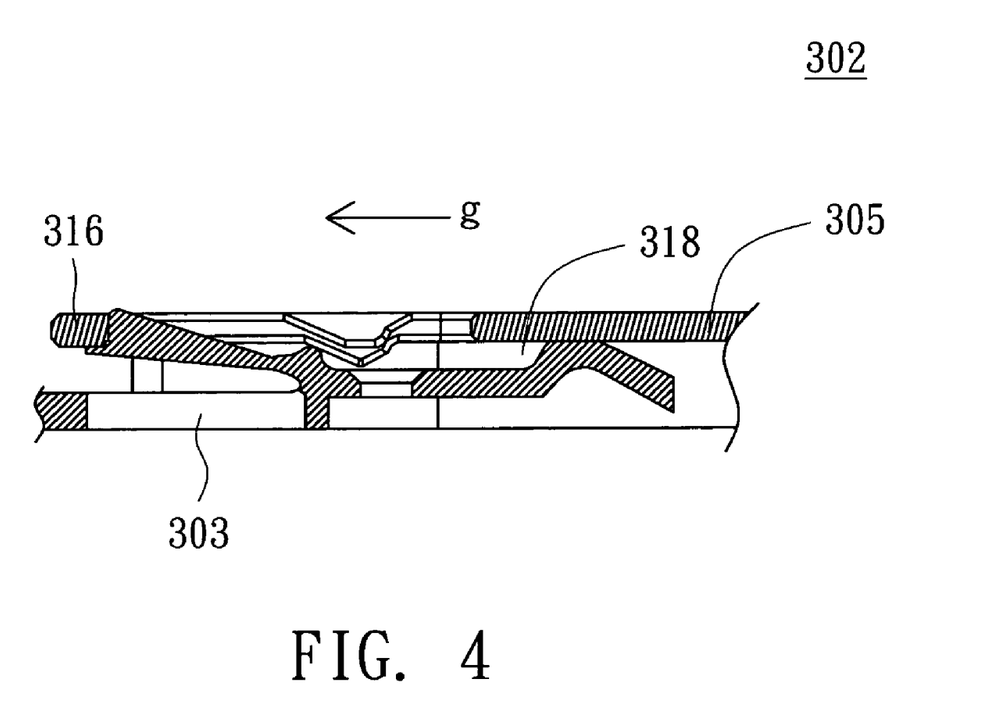
FIG. 4 is a cross-sectional view of a supporting structure when the releasing part of a second embodiment is positioned at a first position.

In the first embodiment, the first body is a supporting frame and the second body is a base. However, in the second embodiment, the first body can be a base and the second body can be a supporting frame. Referring to FIG. 4, a cross-sectional view of a supporting structure when the releasing part of a second embodiment is positioned at a first position is shown. In the supporting structure 302, the first body is a supporting frame 303, and the second body is a base 305. In the second embodiment, the base 305 moves along a gravitational direction, and the way of fastening is reverse to that in the first embodiment. That is, the base 305 has a releasing part and an anti-sliding part 318, while the supporting frame 303 has a first fastening part 316 and a second fastening part 335, such that engaging the base in two stages is achieved.

According to the display device and the base of the same disclosed in the above embodiments of the invention, the two-stage design forces the user to grip the base when detaching the base after the first course. Thus, the user is able to perceive the current position of the base and the base will not slide and come off the body incidentally which may occur if the user presses and slides the base without knowing the current position of the base. Consequently, the accident which may otherwise occur to the user and the damage which may otherwise occur to the base are avoided.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A supporting structure, comprising:
   a first body, comprising:
      a releasing part movable between a first position and a second position; and
      an anti-sliding part; and
   a second body detachably connected to the first body, wherein the second body comprises:
      a first fastening part for fastening the releasing part; and
      a second fastening part for fastening the anti-sliding part;
   wherein, when the releasing part is positioned at the first position, the releasing part is engaged with the first fastening part, and wherein when the releasing part is positioned at the second position, the releasing part is detached from the first fastening part, and the second body is movable along a first direction for enabling the anti-sliding part to be fastened by the second fastening part.

2. The supporting structure according to claim 1, wherein a second direction from the first position to the second position is substantially perpendicular to the first direction.

3. The supporting structure according to claim 1, wherein the second body further has an opening, and when the releasing part is positioned at the first position, the releasing part is projected from the opening and fastened to the first fastening part.

4. The supporting structure according to claim 1, wherein the anti-sliding part has a first slope, the second fastening part has a second slope, and the first slope is substantially equal to the second slope.

5. The supporting structure according to claim 1, wherein the releasing part further comprises a protruding part, the fastening part has a recess, and when the releasing part is positioned at the first position, the protruding part is engaged within the recess.

6. The supporting structure according to claim 1, wherein the releasing part further has a recess, the fastening part comprises a protruding part, and when the releasing part is positioned at the first position, the protruding part is engaged within the recess.

7. A display device, comprising:
a display panel; and
a supporting structure connected to the display panel, wherein the supporting structure comprises:
a first body, comprising:
a releasing part movable between a first position and a second position; and
an anti-sliding part; and
a second body detachably connected to the first body, wherein the second body comprises:
a first fastening part for fastening the releasing part; and
a second fastening part for fastening the anti-sliding part;
wherein, when the releasing part is positioned at the first position, the releasing part is engaged with the first fastening part, and wherein when the releasing part is at the second position, the second body is movable along a first direction for enabling the anti-sliding part to be fastened by the second fastening part.

8. The display device according to claim 7, wherein a second direction from the first position to the second position is substantially perpendicular to the first direction.

9. The display device according to claim 7, wherein the second body further has an opening, and when the releasing part is positioned at the first position, the releasing part is projected from the opening and fastened to the first fastening part.

10. The display device according to claim 7, wherein the anti-sliding part has a first slope, the second fastening part has a second slope, and the first slope is substantially equal to the second slope.

11. The display device according to claim 7, wherein the releasing part further comprises a protruding part, the fastening part has a recess, and when the releasing part is positioned at the first position, the protruding part is engaged within the recess.

12. The display device according to claim 7, wherein the releasing part further has a recess, the fastening part comprises a protruding part, and when the releasing part is positioned at the first position, the protruding part is engaged within the recess.

13. The display device according to claim 7, wherein the first body is a supporting frame, and the second body is a base.

14. The display device according to claim 7, wherein the first body is a base, and the second body is a supporting frame.

15. The display device according to claim 7, the supporting structure further comprises a rotation device for being rotatably connected to the display panel.

\* \* \* \* \*